United States Patent
Garces et al.

(10) Patent No.: US 11,384,014 B2
(45) Date of Patent: Jul. 12, 2022

(54) GLASS MAT REINFORCEMENT

(71) Applicant: SAINT-GOBAIN ADFORS CANADA, LTD., Grand Island, NY (US)

(72) Inventors: Camila A. Garces, Brookline, MA (US); Tao Yu, Wellesley, MA (US); Choung-Houng Lai, Acton, MA (US)

(73) Assignee: SAINT-GOBAIN ADFORS CANADA, LTD., Grand Island, NY (US)

( * ) Notice: Subject to any disclaimer, the term of this patent is extended or adjusted under 35 U.S.C. 154(b) by 180 days.

(21) Appl. No.: 15/165,920

(22) Filed: May 26, 2016

(65) Prior Publication Data

US 2016/0347936 A1   Dec. 1, 2016

Related U.S. Application Data

(60) Provisional application No. 62/166,247, filed on May 26, 2015.

(51) Int. Cl.
| | |
|---|---|
| *C04B 16/04* | (2006.01) |
| *C08J 5/04* | (2006.01) |
| *C04B 14/42* | (2006.01) |
| *C03C 25/285* | (2018.01) |
| *D04H 1/4218* | (2012.01) |
| *D04H 1/64* | (2012.01) |
| *D04H 1/587* | (2012.01) |
| *C08J 3/24* | (2006.01) |

(52) U.S. Cl.
CPC ............ *C04B 16/04* (2013.01); *C03C 25/285* (2013.01); *C04B 14/42* (2013.01); *C08J 3/24* (2013.01); *C08J 5/043* (2013.01); *D04H 1/4218* (2013.01); *D04H 1/587* (2013.01); *D04H 1/64* (2013.01); *C08J 2300/105* (2013.01); *C08J 2325/08* (2013.01); *C08J 2333/06* (2013.01)

(58) Field of Classification Search
CPC ....... C04B 16/04; C04B 14/42; C03C 25/285; C08J 5/043; C08J 3/24; D04H 1/4218; D04H 1/64; D04H 1/587
See application file for complete search history.

(56) References Cited

U.S. PATENT DOCUMENTS

| | | | |
|---|---|---|---|
| 4,076,917 A * | 2/1978 | Swift | ........................ C08K 5/20 525/329.5 |
| 5,143,582 A * | 9/1992 | Arkens | ................... D04H 1/587 162/135 |
| 5,340,868 A | 8/1994 | Strauss et al. | |
| 5,661,213 A | 8/1997 | Arkens et al. | |
| 5,895,804 A | 4/1999 | Lee et al. | |
| 6,114,464 A | 9/2000 | Reck et al. | |
| 6,221,973 B1 * | 4/2001 | Arkens | ...................... C08F 8/14 525/327.7 |
| 6,331,350 B1 | 12/2001 | Taylor et al. | |
| 7,199,179 B2 | 4/2007 | Clamen et al. | |
| 7,399,818 B2 | 7/2008 | Bromm et al. | |
| 7,579,289 B2 | 8/2009 | Clamen et al. | |
| 7,638,579 B2 | 12/2009 | Finch et al. | |
| 7,795,354 B2 | 9/2010 | Srinivasan et al. | |
| 7,803,879 B2 | 9/2010 | Srinivasan et al. | |
| 7,829,611 B2 | 11/2010 | Kelly | |
| 8,106,118 B2 | 1/2012 | Rodrigues et al. | |
| 8,309,651 B2 | 11/2012 | Finch et al. | |
| 8,536,259 B2 | 9/2013 | Carbo et al. | |
| 8,816,016 B2 | 8/2014 | Brady | |
| 2003/0130440 A1 * | 7/2003 | Kaplan | .............. C09D 133/064 525/437 |
| 2004/0038017 A1 | 2/2004 | Tutin et al. | |
| 2004/0254290 A1 | 12/2004 | Rodrigues et al. | |
| 2009/0252962 A1 | 10/2009 | Michl et al. | |
| 2009/0275699 A1 | 11/2009 | Zhang et al. | |

FOREIGN PATENT DOCUMENTS

| | | |
|---|---|---|
| CN | 1174265 A | 2/1998 |
| EP | 2033992 A2 | 3/2009 |
| EP | 1474454 B1 | 11/2009 |
| WO | 2007149643 A1 | 12/2007 |
| WO | 2016191591 A1 | 12/2016 |

OTHER PUBLICATIONS

International Search Report from PCT/US2016/034407 dated Aug. 30, 2016, 1 pg.

Deng Shunyang, Textile Chemicals, Fine Chemical Product Formula and Production Process Series, China Petrochemical Press, the first edition, pp. 235-236, published Aug. 31, 2001 (with English translation).

* cited by examiner

*Primary Examiner* — John E Uselding
(74) *Attorney, Agent, or Firm* — Abel Schillinger, LLP; Thomas H. Osborn

(57) ABSTRACT

A glass mat is provided. The glass mat includes an assembly of glass fibers; and a binder composition including a polymer resin and a crosslinker. The polymer resin has a pH of at least about 5.0. The polymer resin includes a styrenic copolymer, an acrylic copolymer, or combination thereof having at least one functional group of a carboxylic acid, a salt of a carboxylic acid, an anhydride, a salt of an anhydride, or combination thereof. The crosslinker includes a polyol, a polyepoxy, a polycarbodiimide, a polyaziridine, a bivalent metal carbonate, or combination thereof. Further provided is a method of making the glass mat.

15 Claims, No Drawings

GLASS MAT REINFORCEMENT

CROSS-REFERENCE TO RELATED APPLICATION

This application claims priority under 35 U.S.C. § 119(e) to U.S. Provisional Application No. 62/166,247, entitled "GLASS MAT REINFORCEMENT", by Camila A. Garces, Tao Yu and Choung-Houng Lai, filed May 26, 2015, which is assigned to the current assignee hereof and incorporated herein by reference in its entirety.

FIELD OF THE DISCLOSURE

The present disclosure relates to a glass mat and a method for making a glass mat.

BACKGROUND

Resin based binders for wet laid chopped glass fiber mat used for building materials are conventionally prepared using urea formaldehyde ("UF") binders. In some countries, growing environmental pressures are resulting in current or proposed legislation which may limit or eliminate formaldehyde emissions. Accordingly, there is a continued and growing need for compositions which do not emit formaldehyde.

Different types of formaldehyde free binder chemistry have been examined as an environmentally friendly alternative to urea formaldehyde. However, some of the previously available formaldehyde free binders for non-woven mats do not provide all the necessary characteristics for a sufficient end product. For instance, the binder must provide sufficient dry tensile strength, hot tensile strength, and tear strength that pass any commercial standards for the resulting product. Furthermore, the binder must also have desirable processing characteristics, such as cure temperatures and times.

Accordingly, there remains a need for formaldehyde free binders for non-woven mats which have desirable properties.

SUMMARY

In an embodiment, a glass mat is provided. The glass mat includes an assembly of glass fibers; and a binder composition including a polymer resin and a crosslinker. The polymer resin has a pH of at least about 5.0. The polymer resin includes a styrenic copolymer, an acrylic copolymer, or combination thereof having at least one functional group of a carboxylic acid, a salt of a carboxylic acid, an anhydride, a salt of an anhydride, or combination thereof. The crosslinker includes a polyol, a polyepoxy, a polycarbodiimide, a polyaziridine, a bivalent metal carbonate, or combination thereof.

In another embodiment, a method of making a glass mat is provided. The method includes providing a glass mat, wherein the glass mat includes an assembly of glass fibers; and a binder composition. The binder composition includes a polymer resin and a crosslinker. The binder composition includes a polymer resin having a pH of at least about 5.0, wherein the polymer resin includes a styrenic copolymer, an acrylic polymer, or combination thereof having at least one functional group of a carboxylic acid, a salt of a carboxylic acid, an anhydride, a salt of an anhydride, or combination thereof. The crosslinker includes a polyol, a polyepoxy, a polycarbodiimide, a polyaziridine, a bivalent metal carbonate, or combination thereof.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. The term "ASTM C473" is intended to refer to the American Society for Testing and Materials (ASTM) Standard C473-12 Standard Test Methods for Physical Testing of Gypsum Panel Products. The term "filament" is intended to mean an elongated structure or fiber of any suitable length. The term "scrim" is intended to mean a woven or nonwoven fabric that includes at least two filaments oriented in two different directions, including but not limited to a mesh. The term "laid scrim" is intended to mean a scrim in which at least one filament overlies at least one other filament to create the scrim. The term "mat" is intended to mean a woven or nonwoven fabric that includes any suitable arrangement of filaments other than an arrangement of filaments in a scrim, including an arrangement of randomly oriented filaments.

As used herein, the terms "comprises", "comprising", "includes", "including", "has", "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

In an embodiment, the present invention provides a glass mat. The glass mat includes an assembly of glass fibers; and a binder composition. The binder composition includes a polymer resin and a crosslinker. The polymer resin includes a styrenic copolymer, an acrylic copolymer, or combination thereof and has at least one functional group of a carboxylic acid, a salt of a carboxylic acid, an anhydride, a salt of an anhydride, or combination thereof. The binder further includes the crosslinker. In an embodiment, the glass mat provides a reinforcement for any product desired. In a particular embodiment, the glass mat may be used where a formaldehyde-free binder is desirable. In a more particular embodiment, the glass mat may be used in an indoor building application.

The glass mat includes a binder composition that fixedly bonds an assembly of fibers. In an embodiment, the binder composition includes a polymer resin and a crosslinker. The polymer resin can include one or more suitable polymers, one or more suitable copolymers, or a suitable blend or combination thereof. In an example, the binder includes a styrenic copolymer, an acrylic copolymer, or combination thereof. Typically, the binder has an advantageous average molecular weight (Mw) for application, such as an emulsion application. In an embodiment, the binder has an average molecular weight higher than about 3,000 g/mol, such as greater than about 5,000 g/mol, or even greater than about 10,000 g/mol. In an embodiment, the binder has an average molecular weight of less than about 15,000 g/mol, such as less than about 10,000 g/mol, or even less than about 5,000 g/mol. In an embodiment, the binder has an average molecular weight of about 3,000 g/mol to about 1,000,000 g/mol, such as about 3,000 g/mol to about 50,000 g/mol, or even about 10,000 g/mol to about 50,000 g/mol.

Any reasonable styrenic copolymer is envisioned. Typically, the styrenic copolymer is the reaction product of a styrene monomer in combination with at least one unsaturated monomer. The styrenic copolymer includes a block copolymer having a block of styrene. The styrenic copolymer also includes styrenic blocks. Any styrenic monomer is envisioned. For example, the styrenic blocks may be formed from one or more monomers, such as styrene, α-alkyl styrene, or combination thereof. Any alkyl group is envisioned for the α-alkyl styrene and is, for example, methyl, ethyl, butyl, propyl, and the like. Typically, the alkyl group does not include more that 8 carbon atoms. Further styrenic groups may include, for example, any o-alkylstyrene, p-alkyl styrene, m-alkyl styrene, or combination thereof. In an embodiment, the styrene monomer may include the functional group of a carboxylic acid, a salt of a carboxylic acid, an anhydride, a salt of an anhydride, or combination thereof. In an embodiment, styrene monomers may be substituted with a group such as alkyl, aryl, halogen, polar, or combination thereof. Exemplary groups include —CN, —CHO, —COOH, —OCOCH$_3$, —OH, —OCH$_3$, —NO$_2$, —NH$_2$, —SO$_3$H, or combination thereof.

In addition to the styrene monomer, the styrenic copolymer includes at least one unsaturated monomer. In a particular embodiment, the at least one unsaturated monomer includes at least one ethylenically unsaturated monomer. In an embodiment, the at least one ethylenically unsaturated monomer may include the functional group of a carboxylic acid, a salt of a carboxylic acid, an anhydride, a salt of an anhydride, or combination thereof. Any ethylenically unsaturated monomer is envisioned but includes, for instance, an aromatic, a carboxylic acid, a carboxylic acid anhydride, an acrylic, an acrylate, a conjugated diene functional group, or combination thereof. Exemplary ethylenically unsaturated monomers include methyl (meth)acrylate, ethyl (meth)acrylate, propyl (meth)acrylate, butyl (meth) acrylate, acrylic acid, butadiene, isoprene, or combination thereof. In a particular embodiment, the ethylenically unsaturated monomer typically does not include an alkyl group with more than 4 carbon atoms. In a particular embodiment, the styrenic copolymer includes ethylenically unsaturated monomer groups at greater than about 80% by weight, such as greater than about 85% by weight, or greater than about 90% by weight based on the total weight of the polymer resin.

In a particular embodiment, the styrenic copolymer may be a styrene-butadiene, a styrene-methyl (meth)acrylate, a styrene-acrylate, styrene acrylonitrile, styrene-maleic anhydride, or combination thereof. In an embodiment, the binder includes a polystyrene-butadiene copolymer with a carboxylic acid functional group or a poly(acrylic-styrene) resin.

In an embodiment, the polymeric resin of the binder includes an acrylic copolymer. Any acrylic copolymer is envisioned that is the reaction product of at least two acrylic monomers. In an embodiment, the acrylic copolymer includes an acrylic monomer having a functional group of a carboxylic acid, a salt of a carboxylic acid, an anhydride, a salt of an anhydride, or combination thereof. For instance, the acrylic copolymer includes an alkyl (meth)acrylate monomer, an alkyl acrylate monomer, an alkyl methyacrylate, or combination thereof. Any alkyl group is envisioned. In an embodiment, the alkyl group is methyl, ethyl butyl, propyl, or any combination thereof. In a particular embodiment, the alkyl group does not contain more than 8 carbon atoms, such as not more than 5 carbon atoms, or even not more than 4 carbon atoms. An exemplary acrylic copolymer includes methyl methacrylate, n-butyl acrylate, methyl acrylate, ethyl acrylate, isobutyl acrylate, butyl methacrylate, isobutyl methacrylate, glycidyl methacrylate, acrylic acid, methacrylic acid, maleic anhydride, maleic acid, or combination thereof. In an embodiment, the acrylic copolymer is methyl methacrylate, n-butyl acrylate, or combination thereof.

In a particular embodiment, the acrylic copolymer includes an additive such as an acrylic acid. In a particular embodiment, the acrylic acid provides an acid content of about 0.1% by weight to about 12% by weight, such as about 0.1% by weight to about 10% by weight, such as about 1% by weight to about 10% by weight of the total weight of the polymer resin. In a more particular embodiment, the acrylic acid in the acrylic copolymer is present at about 3 weight %, based on the total weight of the acrylic copolymer.

The polymer resin further includes a functional group on the styrenic copolymer, acrylic copolymer, or combination thereof. The functional group is a chemical moiety that is covalently bound to the polymer resin backbone. In an embodiment, the functional group is covalently bonded to the monomer described for the styrene monomer, the ethylenically unsaturated monomer, the acrylic monomer, or combination thereof as described above. In particular, any functional group is envisioned that reacts with the crosslinker of the present invention. For instance, the functional group is a carboxylic acid, a salt of a carboxylic acid, an anhydride, a salt of an anhydride, or combination thereof. In an embodiment, the functional group provides an acid content to the polymer resin. For instance, the functional group provides an acid content of less than about 12% by weight, such as less than about 10% by weight, such as less than about 8% by weight, or even less than about 5% by weight of the total weight of the polymer resin. In an embodiment, the functional group provides an acid content of at least about 0.1% by weight, such as at least about 1% by weight, or even at least about 2% by weight of the total weight of the polymer resin. In a particular embodiment, the functional group provides an acid content of about 0.1% by weight to about 12% by weight, such as about 0.1% by weight to about 10% by weight, such as about 1% by weight to about 10% by weight of the total weight of the polymer resin. All weight % in relation to the binder composition are in relation to the total polymer solids content, i.e. the total dry weight of the polymer resin. In a particular embodiment, the acid content contributes to the pH of the polymer resin, wherein the polymer resin has a pH of at least about 5, such as at least about 7.0, at least about 8.0, or even at least about 8.5.

Further included in the binder composition is a crosslinker that provides crosslinking of the functional groups on the chemical backbone of the polymeric resin. Exemplary crosslinkers include a polyol, a polyepoxy, a polycarbodiimide, a polyaziridine, a bivalent metal carbonate, or combination thereof. In an embodiment, the bivalent metal carbonate is ammonium zirconium carbonate, zinc ammonium carbonate, or combination thereof. In a particular embodiment, the crosslinker is a polyol. In an example, the polyol includes at least two hydroxyl groups. In an embodiment, the polyol has an average molecular weight of less than about 1000 g/mol, such as less than about 700 g/mol, or even less than about 400 g/mol. In a particular embodiment, the polyol includes β-hydroxyalkylamide, ethylene glycol, triethanolamine, diethanolamine, glycerol, catechol, resorcinol, or combination thereof. In a more particular embodiment, the polyol is β-hydroxyalkylamide, such as with a hydroxyl value of about 500 mgKOH/g to about 700 mgKOH/g. Typically, the crosslinker is present in any reasonable amount envisioned. In an embodiment, the crosslinker is present at up to about 12% by weight, such as about 0.1% by weight to about 12% by weight, such as about 2% by weight to about 8% by weight, or even about 4% by weight to about 6% by weight based on a total weight of the polymer resin.

The binder composition can also include any suitable additives. For example, such additives can include, but are not limited to, a buffer, an adhesion promoter to enhance the adhesion of the binder composition to the glass mat to increase the bonding strength between the assembly of fibers, a wax, a thickening agent, a defoaming agent, a surfactant, a lubricant, a process aid additive, a heat stabilizer, a silica colloid to enhance fire resistance, a biocide, a pigment, the like, or any combination thereof. In a particular embodiment, a buffer is included to maintain the pH of the polymeric resin. For instance, the buffer includes triethanolamine, a barbital buffer, a phosphate buffer, or combination thereof. Any amount of buffer is envisioned to maintain the pH of the polymeric resin of at least about 5.0, at least about 7.0, at least about 8.0, or even at least about 8.5.

The amount of additives in the binder composition can vary depending on the process and binder performance requirements. In an embodiment, the binder composition can include less than about 25% by weight of additives, such as less than about 15% by weight, such as less than about 10% by weight, based on the total weight of the binder composition. In another embodiment, the binder composition is substantially free of additives. "Substantially free" as used herein refers to less than about 1% by weight of additives, less than about 0.5% by weight of additives, or even less than about 0.1% by weight of additives, based on the total weight of the binder composition.

In a particular example, the binder composition may consist essentially of the polymer resin and the crosslinker. As used herein, the phrase "consists essentially of" used in connection with the binder composition precludes the presence of a monomer, a polymer, a reactive moiety, or combination thereof that affect the basic and novel characteristics of the binder composition, although, commonly used processing agents and additives may be used in the binder composition.

The binder composition can be applied by any suitable method. For example, during application the binder composition can be in the form of an emulsion, such as an aqueous emulsion. In an embodiment, the binder composition can represent any suitable proportion of a glass mat, such as about 1% by weight to about 80% by weight of the glass mat, such as about 5% by weight to about 50% by weight of the glass mat, or even about 10% by weight to about 35% by weight of the cured glass mat.

The binder composition is used to fixedly bond an assembly of fibers. Any assembly of fibers is envisioned and includes, for example, non-woven fibers, woven fibers, a laid scrim, a woven scrim, and the like. In a particular embodiment, the assembly of fibers is a non-woven mat. In a particular embodiment, the assembly of fibers can be any length such as continuous strand, chopped, or combination thereof. In a more particular embodiment, the assembly of fibers is chopped into suitable random lengths to provide randomly disposed fibers. Any reasonable length of fibers is envisioned. Any reasonable diameter of the fibers is envisioned. Generally, fibers having a length of about 0.75 inches to about 3 inches and a diameter of at least about 3 microns, such as about 3 microns to about 20 microns, such as at least about 14 microns, such as about 15 microns, or even 16 microns are used. Each assembly may contain any reasonable amount of fibers. In an embodiment, the assembly of glass fibers is about 20-300 or more. The assembly of fibers can include a variety of suitable materials. For instance, the assembly of fibers can include a glass fiber, such as a fiber made from A-type glass fiber, a C-type glass fiber, an E-type glass fiber, an S-type glass fiber, an E-CR-type glass fiber, a wool glass fiber, or a combination thereof. Any suitable configuration of the assembly of fibers is envisioned. In an embodiment, the assembly of fibers may be in a non-woven mat.

An exemplary method of making the glass mat includes providing the assembly of glass fibers. Typically, the assembly of fibers is added to a dispersant medium to form an aqueous slurry, know in the art as "white water". The white water typically contains glass, a dispersant, a viscosity modifier, foam control, a biocide additive, or combination thereof. The fibrous slurry is then agitated to form a workable, uniform dispersion of glass fiber having a suitable consistency. The dispersant may contain polyacrylamide, hydroxyethyl cellulose, and other additive such as a surfactant, a lubricant, a defoamer, the like, or combination thereof.

The fiber and white water dispersion is then passed onto a mat-forming machine containing a mat forming screen. The dispersion is usually diluted with water to a lower fiber concentration prior to being dispersed on a screen. The fibers are collected at the screen in the form of a wet fiber mat, and the excess water is removed by gravity or, more preferably, by vacuum in a conventional manner, such as by vacuum boxes. Although this generally describes a wet-laid process, a dry-laid process may also be envisioned. For instance, with a dry-laid process, fibers may be spun from a bushing directly onto a moving web. The binder composition is subsequently applied.

The binder composition is typically applied to the gravity- or vacuum-assisted de-watered white glass mat. Application of the binder composition may be accomplished by any conventional means, such as by soaking the mat in an excess of binder solution, or by coating the mat surface by means of a binder applicator such as a sprayer or roll. The components of the binder composition may be applied separately or mixed together by any method envisioned. For instance, if applied separately, the components of the binder composition may be added by the same or a different method. In an embodiment, any other sequence of adding the components of the binder composition is envisioned. The total concentration of components in the binder composition in an aqueous solution can vary widely in accordance with the practice of the present invention.

Following application of the binder composition, the glass fiber mat is de-watered by any reasonable means, such as under vacuum, to remove excess binder solution. In an embodiment, the mat is dried prior to cure. Any method of drying the glass mat is envisioned. In a particular embodiment, the drying is at a temperature wherein the glass mat does not reach the cure temperature of the binder and is dependent upon the binder chosen. For instance, drying is with forced heated air, such as a convection oven, an IR oven, such as a gas firing IR oven, electric IR oven, or combination thereof. In an exemplary embodiment, at least about 99%, such as at least about 99.5%, or even at least about 99.9% of water weight of the aqueous binder is removed during the drying process.

The glass mat is subjected to cure of the binder. In an embodiment, the cure of the binder is facilitated with heat provided by any reasonable means. In an embodiment, the cure is facilitated by heated air, such as a convection oven, an IR oven, such as a gas firing IR oven, an electric IR oven, or combination thereof. Any reasonable time and temperatures is envisioned and is dependent upon the binder composition. In an embodiment, the cure is at a temperature of about 150° C. to about 280° C., such as about 150° C. to about 220° C., such as about 150° C. to about 200° C., such as about 180° C. for any reasonable amount of time to cure the binder, such as about 5 seconds to about 10 minutes, such as about 10 seconds to about 5 minutes. In a particular embodiment, the cure is at a temperature of about 220° C. to about 280° C., such as about 230° C. to about 270° C., such as about 250° C. for any reasonable amount of time to cure the binder, such as about 5 seconds to about 10 minutes, such as about 10 seconds to about 5 minutes. In an embodiment, heat treatment is sufficient to effect curing. In an embodiment, catalytic curing may also be used, such as with a latent acid catalyst. In an alternative embodiment, the cure is without catalytic curing and the binder composition is substantially free of any latent acid catalyst with such as less than about 99.5% by weight of any latent acid catalyst based on the total weight of the binder composition.

The glass mat as described has advantageous properties. The glass mat of the present invention has physical properties such as desirable tensile strength, retention of a tensile strength and tear strength. The tensile test includes an oppositional pull of a 3.0 inch wide test piece (a 76.2±0.1 mm wide test piece with a 228.6 mm±0.8 mm length clamped to allow a clamp separation of 177.8±0.1 mm) at a constant rate of 50.8 mm per/minute to record the force at break. Wet tensile strength is measured using an Instron tensile test after a sample is subjected to submersion in hot water (82.2° C.) for 10 minutes under mild agitation with testing within about 3 minutes of removal from the water bath. The retention of tensile strength is the amount of tensile strength retained for the glass mat after a wet test in comparison to the glass mat when dry. Wet tensile retention is calculated by dividing the wet tensile strength by dry tensile strength (in a machine or cross direction) and multiplying the value by 100 to provide a percentage value. For instance, the glass mat has a retention of a tensile strength after a wet test of at least about 60%, such as at least about 70%, or even at least about 80%, as measured by the above method. In an embodiment, the glass mat has a wet tensile strength of at least about 120 N/3 inch, such as at least about 200 N/3 inch, such as at least about 250 N/3 inch, or even at least about 300 N/3 inch. Further, the glass mat has a dry tensile strength of at least about 200 N/3 inch, such as at least about 250N/3 inch, or even about 300 N/3 inch and no greater than about 700 N/3 inch, such as about 300 N/3 inch to about 700 N/3 inch, as measured by an Instron machine and the testing as described. In an embodiment, the glass mat has a desirable tear strength such as a tear strength of at least about 550, such as about 550 to about 800, or even greater than about 800, as measured in the cross direction, as measured by an Instron machine in tensile strength set up under the American Roofing Manufacturer's Association (ARMA) 4-82 standard, testing modified from a 2 inch width test strip to a 3 inch width test strip. In an embodiment, the glass mat passes GreenGuard certification for indoor facer applications.

In addition to providing advantageous physical properties, the glass mat has a binder composition that is substantially formaldehyde free. "Substantially formaldehyde free" as used herein refers to formaldehyde being present at less than 99.9% weight, or even 100% weight of the total binder composition, and even the total glass mat composition.

The glass mat as described above can be provided in any suitable manner to provide for a construction product suitable for an industrial building material, a residential building material, or a commercial building material. Although any size glass mat is envisioned depending upon the properties desired for the final product, an exemplary glass mat can have a weight of about 0.5 pounds/100 square feet to about 6.0 pounds/100 square feet. Further, any thickness of the glass mat is envisioned and includes, for example, at least about 15 mils, such as at least about 20 mils. In an embodiment, the thickness is not greater than about 45 mils, such as about 15 mils to about 45 mils. Any construction product is envisioned where tensile strength, tear strength, and formaldehyde free properties are desired. An exemplary construction product includes, for example, gypsum wall board, a cement board, a tile, a ceiling tile, a dry wall joint tape, a dry wall joint patch, a carpet backing, a carpet tile, and a roofing shingle.

In an embodiment, the construction product is a facer for a gypsum wall board or a cement board. The glass mat can be provided in the cementitious product to provide structural integrity to the resulting cementitious product. The glass mat may be situated in any suitable configuration within the cementitious product. In an embodiment, the glass mat can be adhered, affixed, or otherwise coupled to any suitable surface, edge, or face of an existing cementitious product. For example, the glass mat can be produced as described above and then adhered to a cured cementitious product. Alternatively, the glass mat can be produced simultaneously or concurrently while it is being coupled to a cementitious product. In an embodiment, at least a portion of the glass mat can be at least partially embedded to any suitable depth from a surface or edge of the cementitious product. For example, at least a portion of the glass mat can be embedded to between about 0.01 inches and about 0.25 inches from a surface or edge of the cementitious product. "Partially embedded," as used herein, refers to a depth within the cementitious product of at least about 0.01 inches. In a particular embodiment, the glass mat can be substantially embedded. "Substantially embedded," as used herein, refers to a depth within the cementitious product of at least about 0.05 inches. For example, the glass mat can be partially or substantially embedded in a cementitious slurry or mixture that is thereafter dried, hardened, or otherwise cured to provide a cementitious product with the glass mat partially or substantially embedded to a suitable depth from a surface or edge of the cementitious product. In an embodiment, the cementitious slurry substantially impregnates a plurality of interstices between the assembly of fibers. In a further embodiment, a cementitious product can include any suitable number of glass mats as described herein. For example, a cementitious product can include more than one glass mat, each of which can be at least partially embedded to a suitable depth from opposite major surfaces of the cementitious product. Any cementitious slurry is envisioned. In an embodiment, the cementitious slurry includes Portland cement, magnesia cement, alumina cement, gypsum, blends, or combination thereof.

Any one or more suitable components are envisioned for the glass mat depending upon the final product and properties desired. In an embodiment, the glass mat can include one component such as a nonwoven laid scrim. In another embodiment, the glass mat can include more than one component, such as one or more scrims, either woven or nonwoven, suitably coupled to one or more mats, either woven or nonwoven. For example, a woven scrim including glass fibers can be coupled to a nonwoven mat including polymer fibers. In an embodiment, the glass mat can include any polymer film coatings. Any method of assembling the components is envisioned and is dependent upon the materials chosen. Further any order of assembling the components is envisioned. The components can include a plurality of filaments can include a variety of suitable materials. For instance, the plurality of filaments can include a polymer, a glass, or combination thereof.

The glass mat with the binder as described can include suitable properties, including suitable loss on ignition (LOI) values. In an embodiment, the glass mat can also include a LOI value of at least about 20%, as measured by ASTM D123. In another embodiment, the glass mat can include a LOI value between about 12% and about 40%, such as about 20% to about 40%, depending on the weight percentage of the binder included relative to the total weight of the glass mat. Any reasonable LOI value can be envisioned for the glass mat depending on the weight percentage of the binder included relative to the total weight of the glass mat.

A cementitious product including the glass mat and binder as described above can include desirable properties, such as resistance to deformation and maintenance of tensile strength, even after the cementitious product is exposed to one or more environmental conditions that could degrade the cementitious product. The cementitious product with the glass mat and the binder composition of the present invention can include average MOR values that meet or even exceed values required by industry standards depending upon the final application and end use. In an embodiment, average MOR values can be obtained using a variety of suitable methods, such as pursuant to ASTM C473. In an embodiment, the conventional cementitious product can undergo a suitable alkali aging process in accordance with any other suitable standards, such as pursuant to ACI440c and/or ETAG standards. After the conventional cementitious product has undergone alkali aging, the average MOR value of the product can be obtained again, pursuant to ASTM C473, to analyze the impact of the alkali aging on the tensile strength of the conventional cementitious product. After alkali aging, the cementitious product with the glass mat and binder of the present invention exhibits average MOR values after alkali aging that meet or even exceed values required by industry standards depending upon the final application and end use.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A glass mat including: an assembly of glass fibers; and a binder composition including a polymer resin having a pH of at least about 5.0, wherein the polymer resin includes a styrenic copolymer, an acrylic copolymer, or combination thereof having at least one functional group of a carboxylic acid, a salt of a carboxylic acid, an anhydride, a salt of an anhydride, or combination thereof; and a crosslinker including a polyol, a polyepoxy, a polycarbodiimide, a polyaziridine, a bivalent metal carbonate, or combination thereof.

Embodiment 2

A method of making a glass mat, the method including providing a glass mat, wherein the glass mat includes an assembly of glass fibers; and a binder composition including a polymer resin having a pH of at least about 5.0, wherein the polymer resin includes a styrenic copolymer, an acrylic copolymer, or combination thereof having at least one functional group of a carboxylic acid, a salt of a carboxylic acid, an anhydride, a salt of an anhydride, or combination thereof; and a crosslinker including a polyol, a polyepoxy, a polycarbodiimide, a polyaziridine, a bivalent metal carbonate, or combination thereof.

Embodiment 3

The glass mat or method of any of the preceding embodiments, wherein the styrenic copolymer is prepared from a styrene monomer and at least an ethylenically unsaturated monomer including an aromatic, a carboxylic acid, a carboxylic acid anhydride, an acrylic, an acrylate, conjugated diene functional group, or combination thereof.

Embodiment 4

The glass mat or method of embodiment 3, wherein the styrene monomer includes styrene, α-alkyl styrene, or combination thereof and the ethylenically unsaturated monomer includes methyl (meth)acrylate, ethyl (meth)acrylate, propyl (meth)acrylate, butyl (meth)acrylate, acrylic acid, butadiene, isoprene, styrene acrylate, or combination thereof.

Embodiment 5

The glass mat or method of any of the preceding embodiments, wherein the acrylic polymer includes an alkyl (meth) acrylate monomer, an alkyl acrylate monomer, an alkyl methyacrylate, or combination thereof.

Embodiment 6

The glass mat or method of embodiment 5, wherein the acrylic polymer includes methyl methacrylate, n-butyl acrylate, methyl acrylate, ethyl acrylate, isobutyl acrylate, butyl methacrylate, isobutyl methacrylate, glycidyl methacrylate, acrylic acid, methacrylic acid, maleic anhydride, maleic acid, or combination thereof.

Embodiment 7

The glass mat or method of any of the preceding embodiments, wherein the polymer resin includes the ethylenically unsaturated monomer groups at greater than about 80% by weight, such as greater than about 85% by weight, or greater than about 90% by weight based on a total weight of the polymer resin.

Embodiment 8

The glass mat or method of any of the preceding embodiments, wherein the polymer resin has an acid content of less than about 12% by weight, such as less than about 10% by weight, such as less than about 8% by weight, or even less than about 5% by weight of the total weight of the polymer resin.

Embodiment 9

The glass mat or method of any of the preceding embodiments, wherein the crosslinker is present at up to about 12% by weight, about 0.1% by weight to about 12% by weight, such as about 2% by weight to about 8% by weight, or even about 4% by weight to about 6% by weight based on a total weight of the polymer resin.

Embodiment 10

The glass mat or method of any of the preceding embodiments, wherein the polymer resin has a pH of at least about 7.0, at least about 8.0, or even at least about 8.5.

Embodiment 11

The glass mat or method of any of the preceding embodiments, wherein the polyol includes at least two hydroxyl groups and an average molecular weight of less than about 1000 g/mol, less than about 700 g/mol, such as less than about 400 g/mol.

Embodiment 12

The glass mat or method of embodiment 11, wherein the polyol includes a β-hydroxyalkylamide, ethylene glycol, triethanolamine, diethanolamine, glycerol, catechol, resorcinol, or combination thereof.

Embodiment 13

The glass mat or method of embodiment 12, wherein the β-hydroxyalkylamide has a hydroxyl value of about 500 mgKOH/g to about 700 mgKOH/g.

Embodiment 14

The glass mat or method of any of the preceding embodiments, wherein the binder composition fixedly bonds the assembly of fibers.

Embodiment 15

The glass mat or method of any of the preceding embodiments, wherein the binder composition is about 10% by weight to about 35% by weight of the cured glass mat.

Embodiment 16

The glass mat or method of any of the preceding embodiments, wherein the assembly of fibers includes a non-woven mat.

Embodiment 17

The glass mat or method of embodiment 16, wherein the non-woven mat includes randomly disposed fibers.

Embodiment 18

The glass mat or method of any of the preceding embodiments, wherein the assembly of fibers includes an A-type glass fiber, a C-type glass fiber, an E-type glass fiber, an S-type glass fiber, an E-CR-type glass fiber, a wool glass fiber, or a combination thereof.

Embodiment 19

The glass mat or method of any of the preceding embodiments, wherein the glass mat has a weight of about 0.5 pound/100 square feet to about 6.0 pound/100 square feet.

Embodiment 20

The glass mat or method of any of the preceding embodiments, wherein the glass mat has a retention of a tensile strength after a wet test of at least about 60%, such as at least about 70%, or even at least about 80%.

Embodiment 21

The glass mat or method of any of the preceding embodiments, wherein the binder includes a polystyrene-copolymer with carboxylic acid groups having an average molecular weight of about 3,000 g/mol to about 1,000,000 g/mol, such as about 3,000 g/mol to about 50,000 g/mol, or even about 10,000 g/mol to about 50,000 g/mol.

Embodiment 22

The glass mat or method of any of the preceding embodiments, wherein the binder further includes a buffer to provide a basic pH.

Embodiment 23

The glass mat or method of embodiment 22, wherein the buffer includes triethanolamine, a barbital buffer, a phosphate buffer, or combination thereof.

Embodiment 24

The glass mat or method of any of the preceding embodiments, wherein the glass mat has a dry tensile strength of at least about 200 N/3 inch, such as at least about 250N/3 inch, or even about 300 N/3 inch and no greater than about 700 N/3 inch, such as about 300 N/3 inch to about 700 N/3 inch.

Embodiment 25

The glass mat or method of any of the preceding embodiments, wherein the binder is substantially free of formaldehyde.

Embodiment 26

The glass mat of any of the preceding embodiments, wherein the glass mat is configured for an industrial building material, a residential building material, or a commercial building material.

Embodiment 27

The glass mat of embodiment 26, wherein the glass mat is configured for a gypsum wall board, a cement board, a tile, a ceiling tile, a dry wall joint tape, a dry wall joint patch, a carpet backing, a carpet tile, or a roofing shingle.

Embodiment 28

The method of embodiment 2, wherein the binder composition is applied in an aqueous solution.

Embodiment 29

The method of embodiment 2, wherein the binder composition is cured at a temperature of about 150° C. to about 280° C. for a time of about 5 seconds to about 10 minutes.

Embodiment 30

The method of embodiment 2, further including substantially embedding the glass mat in a cementitious slurry.

Embodiment 31

The method of embodiment 30, wherein the cementitious slurry includes Portland cement, magnesia cement, alumina cement, gypsum, blends, or combinations thereof.

Embodiment 32

The method of embodiment 30, wherein the cementitious slurry substantially impregnates a plurality of interstices between the assembly of fibers.

The following example is provided to better disclose and teach processes and compositions of the present invention. It is for illustrative purposes only, and it must be acknowledged that minor variations and changes can be made without materially affecting the spirit and scope of the invention as recited in the claims that follow.

EXAMPLES

Fabrication of Non-Woven Glass Mats with Different Types of Resins

Different types of resins are tested as binders in the fabrication of non-woven fibers. The resins are combined with a β-hydroxyalkylamide crosslinker. A fiber glass mat is fabricated by collection of dispersed fibers in water over a mesh. The mat is covered by spraying the solution of the resin with the crosslinker. The excess of material is extracted from the mat by passing it through a vacuum system. The impregnated mat is then placed in a convection oven to evaporate the excess water and crosslink the resin. The mats are tested by dry and wet tensile strength as described above. The formulations used for this example are listed in Table 1 including the properties of the resins. The properties of the glass mats are listed in Table 2. Clearly, both samples provide desirable wet and dry tensile strength values with Example 2 having particularly advantageous values.

TABLE 1

Formulations with different types of resins using a β-hydroxyalkylamide crosslinker.

| Example | Resin Type (emulsion) | % solids | pH | Tg (° C.) | Crosslinker amount (wt %) |
|---|---|---|---|---|---|
| 1 | Poly(Acrylic - Styrene) resin-1 | 47.5 | 8.5 | 40 | 4% |
| 2 | Carboxylic acid functionalized poly (Styrene -co- Butadiene) resin | 46 | 6.5 | 12 | 4% |

TABLE 2

Tensile strength properties of the resins.

| Example | Resin Type (emulsion) | Dry tensile strength (N/3 in) | Wet tensile strength (N/3 in) |
|---|---|---|---|
| 1 | Poly(Acrylic - Styrene) resin-1 | 445 | 333 |
| 2 | Carboxylic acid functionalized poly (Styrene -co- Butadiene) resin | 331 | 263 |

Fabrication of Non-Woven Glass Mats with Combination of Different Types of Crosslinkers A combination of different types of crosslinkers are tested with an poly(acrylic-styrene) binders in the fabrication of non-woven fibers. The resin used in these examples is a poly(Acrylic-Styrene) resin-2 with Tg 98° C., pH of 8.3 and solid content of 48%. This resin is combined with a total of 4 wt % of crosslinkers based on solid content of the resin. Solid content of the resin is equivalent to the total weight of the resin. The crosslinker system contains β-hydroxyalkylamide as main crosslinker combined with other types of crosslinkers. The procedure to fabricate the non-woven glass mat is described in the previous examples. The mats are tested using dry and wet tensile strength method. The formulations used for these examples are listed in Table 3 including the tensile strength properties.

TABLE 3

Tensile strength properties of examples with combination of crosslinkers.

| Example | Resin Type (emulsion) | Crosslinker 2 | Crosslinker 2 amount (wt %) | Dry tensile strength (N/3 in) | Wet tensile strength (N/3 in) |
|---|---|---|---|---|---|
| 3 | Poly(Acrylic - Styrene) resin-2 | Potassium zirconium carbonate | 2 | 259 | 175 |
| 4 | Poly(Acrylic - Styrene) resin-2 | Ammonium Zirconium carbonate | 2 | 233 | 212 |
| 5 | Poly(Acrylic - Styrene) resin-2 | Triethanolamine | 1 | 273 | 278 |

Fabrication of Non-Woven Glass Mats with Different Amounts of Crosslinker

Different amounts of crosslinker β-hydroxyalkylamide are tested with the poly(acrylic-styrene) resin 1. The fabrication of non-woven fibers is described in previous examples. The resin is combined with 0 to 12 wt % of crosslinker based on solid content. The mats are tested using dry and wet tensile strength method. The formulations used for these examples are listed in Table 4 including the tensile strength properties.

TABLE 4

Tensile strength properties of examples with different amounts of crosslinker β-hydroxyalkylamide.

| Example | Crosslinker amount (wt %) | Dry tensile strength (N/3 in) | Wet tensile strength (N/3 in) |
|---|---|---|---|
| 6 | 0 | 315 | 271 |
| 7 | 2 | 461 | 346 |
| 8 | 4 | 412 | 331 |
| 9 | 6 | 413 | 298 |

Fabrication of Non-Woven Glass Mats with Different Combinations of Resins

The poly(acrylic-styrene) resin-2 used for examples 3 to 5 is combined with two different resins in the formulation. The poly(acrylic-styrene) resin-2 includes a crosslinker of β-hydroxyalkylamide present in an amount of 4 wt. % based on the total solid content of poly(acrylic-styrene) resin-2. In example 10, the additional resin is a carboxylic acid functionalized poly (styrene-co-butadiene) resin with $T_g$ of 24° C., pH 8.0 and solid content of 49 wt % with a crosslinker, β-hydroxyalkylamide, present in an amount of 4 wt. % based on the total solid content of carboxylic acid functionalized poly(styrene-co-butadiene) resin. In example 11, the additional resin is a low molecular weight ($M_n$=13,000 g/mol) poly(acrylic-styrene) resin-3 that is in solution instead of emulsion with a crosslinker, β-hydroxyalkylamide, present in an amount of 10 wt. % based on total solid content of poly(acrylic-styrene) resin-3. The fabrication of non-woven fibers is described in previous examples. The mats are tested using dry and wet tensile strength method. The formulations used for these examples are listed in Table 5 including the tensile strength properties. Desirable values were obtained for glass mat applications.

TABLE 5

| Example | Additional resin Type | Add. Resin amount/ total resin (wt %) | Crosslinker amount for additional resin only (wt %) | Tg (° C.) | pH | Solid content | Dry tensile strength (N/3 in) | Wet tensile strength (N/3 in) |
|---|---|---|---|---|---|---|---|---|
| 10 | Carboxylic acid functionalized poly(styrene-co-butadiene) resin | 25 | 4 | 24 | 8.0 | 49% | 326 | 256 |
| 11 | Poly(acrylic-styrene)resin-3 (solution) | 25 | 10 | 73° C. | 8.3 | 30.5% | 469 | 362 |

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A glass mat comprising:
an assembly of glass fibers; and
a binder composition comprising a cured product of a polymer resin having a pH of at least about 5.0, wherein the polymer resin consists of a styrenic copolymer with at least one functional group on the styrenic copolymer, wherein the styrenic copolymer consists of a styrene-butadiene, a styrene-methyl (meth)acrylate, a styrene-acrylate, a styrene acrylonitrile, a poly(acrylic-styrene), or combination thereof, wherein the at least one functional group consists of a carboxylic acid, a salt of a carboxylic acid, or combination thereof, and a crosslinker present at an amount of about 0.1% by weight to about 8% by weight based on the total weight of the polymer resin, the crosslinker consisting of a main crosslinker and an optional crosslinker, the main crosslinker consisting of a β-hydroxyalkylamide and the optional crosslinker consisting of a polyepoxy, a polycarbodiimide, a polyaziridine, a bivalent metal carbonate, or combination thereof.

2. The glass mat according to claim 1, wherein the polymer resin has an acid content of less than about 12% by weight based on a total weight of the polymer resin.

3. The glass mat according to claim 1, wherein the crosslinker is present at about 2% by weight to about 8% by weight based on a total weight of the polymer resin.

4. The glass mat according to claim 1, wherein the β-hydroxyalkylamide comprises an average molecular weight of less than about 1000 g/mol.

5. The glass mat according to claim 1, wherein the assembly of fibers includes a non-woven mat.

6. A method of making a glass mat, the method comprising providing a glass mat, wherein the glass mat comprises:
an assembly of glass fibers; and
a binder composition comprising a polymer resin having a pH of at least about 5.0, wherein the polymer resin consists of a styrenic copolymer with at least one functional group on the styrenic copolymer, wherein the styrenic copolymer consists of a styrene-butadiene, a styrene-methyl (meth)acrylate, a styrene-acrylate, a styrene acrylonitrile, a poly(acrylic-styrene), or combination thereof, wherein the at least one functional group consists of a carboxylic acid, a salt of a carboxylic acid, or combination thereof; and a crosslinker present at an amount of about 0.1% by weight to about 8% by weight based on the total weight of the polymer resin, the crosslinker consisting of a main crosslinker and an optional crosslinker, the main crosslinker consisting of a β-hydroxyalkylamide and the optional crosslinker consisting of a polyepoxy, a polycarbodiimide, a polyaziridine, a bivalent metal carbonate, or combination thereof.

7. The method according to claim 6, wherein the β-hydroxyalkylamide comprises an average molecular weight of less than about 1000 g/mol.

8. The method according to claim 6, wherein the binder composition is applied in an aqueous solution.

9. The method according to claim 6, further comprising substantially embedding the glass mat in a cementitious slurry.

10. The glass mat according to claim 1, wherein the styrenic copolymer consists of a styrene-butadiene, a poly(acrylic-styrene), or combination thereof.

11. The glass mat according to claim 1, wherein the (3-hydroxyalkylamide has a hydroxyl value of about 500 mgKOH/g to about 700 mgKOH/g.

12. The glass mat according to claim 1, wherein the binder composition is about 10% by weight to about 35% by weight of the cured glass mat.

13. The glass mat according to claim 1, wherein the glass mat is substantially embedded in a cementitious slurry.

14. The glass mat according to claim 1, wherein the glass mat has a weight of about 0.5 pound/100 square feet to about 6.0 pound/100 square feet.

15. The glass mat according to claim 1, wherein the glass mat is configured for a gypsum wall board, a cement board, a tile, a ceiling tile, a dry wall joint tape, a dry wall joint patch, a carpet backing, a carpet tile, or a roofing shingle.

* * * * *

UNITED STATES PATENT AND TRADEMARK OFFICE
CERTIFICATE OF CORRECTION

| | | |
|---|---|---|
| PATENT NO. | : 11,384,014 B2 | Page 1 of 1 |
| APPLICATION NO. | : 15/165920 | |
| DATED | : July 12, 2022 | |
| INVENTOR(S) | : Camila A. Garces et al. | |

It is certified that error appears in the above-identified patent and that said Letters Patent is hereby corrected as shown below:

In the Claims

In Column 18, Lines 43-44, please delete "the (3-hydroxyalkylamide has", and insert --the β-hydroxyalkylamide has--

Signed and Sealed this
Twenty-sixth Day of September, 2023

Katherine Kelly Vidal
*Director of the United States Patent and Trademark Office*